Feb. 5, 1952 M. A. WECKERLY 2,584,950
SENSITIVITY ADJUSTMENT FOR WEIGHING SCALES
Filed March 3, 1947 3 Sheets-Sheet 3
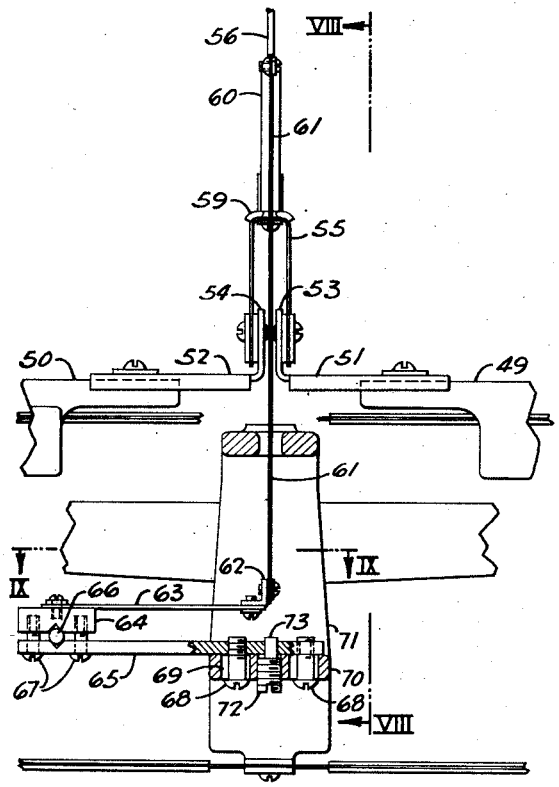
Fig. VII
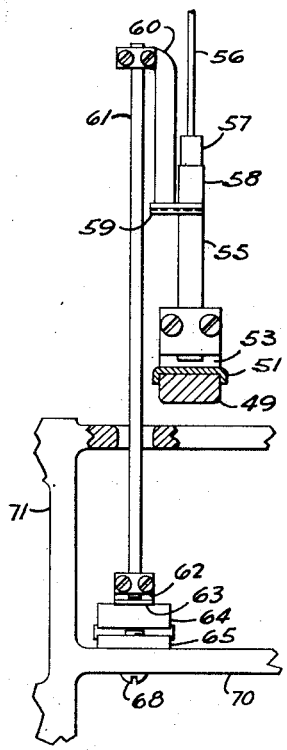
Fig. VIII
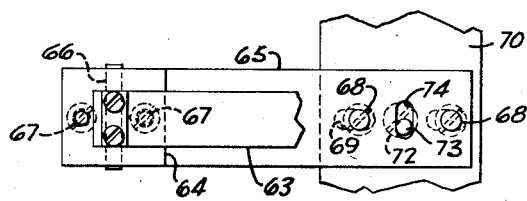
Fig. IX
INVENTOR.
Mark A. Weckerly
BY
Marshall and Marshall
ATTORNEYS Patented Feb. 5, 1952

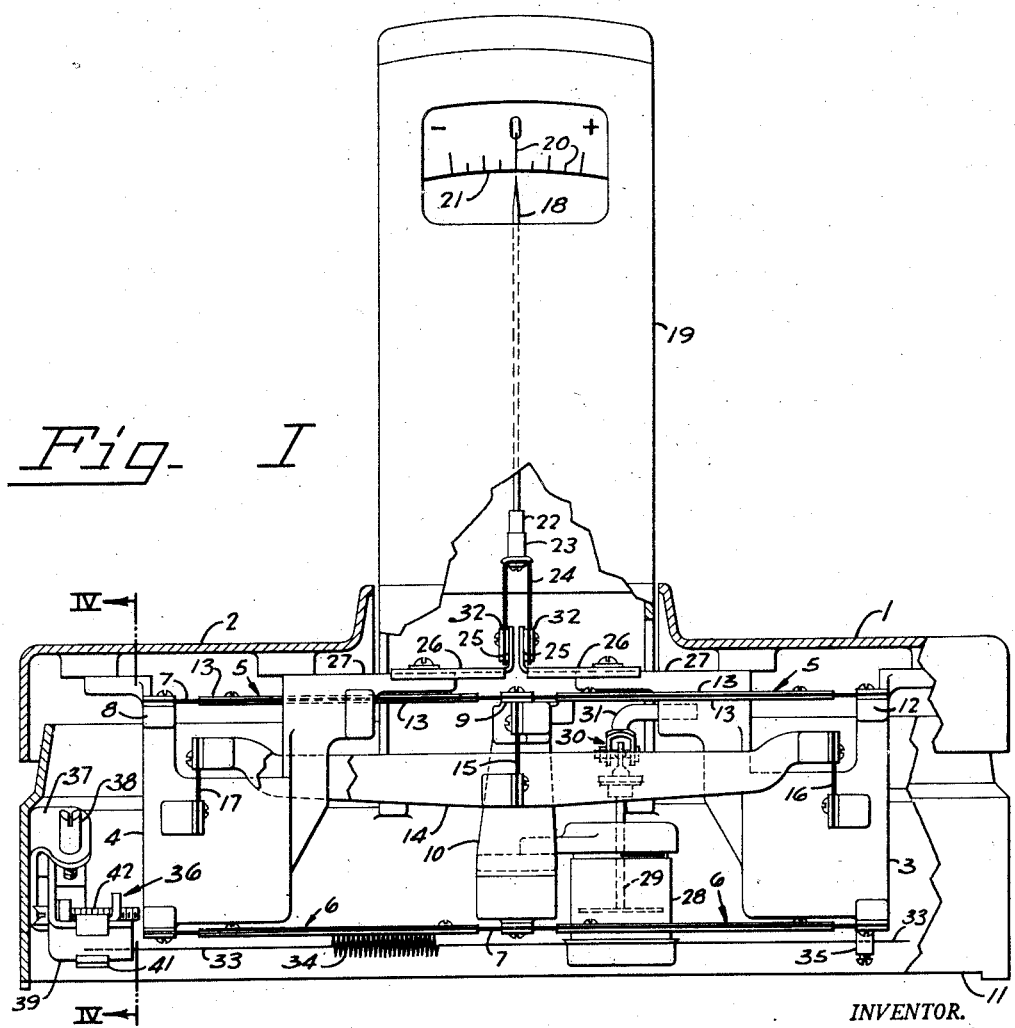
Fig. I

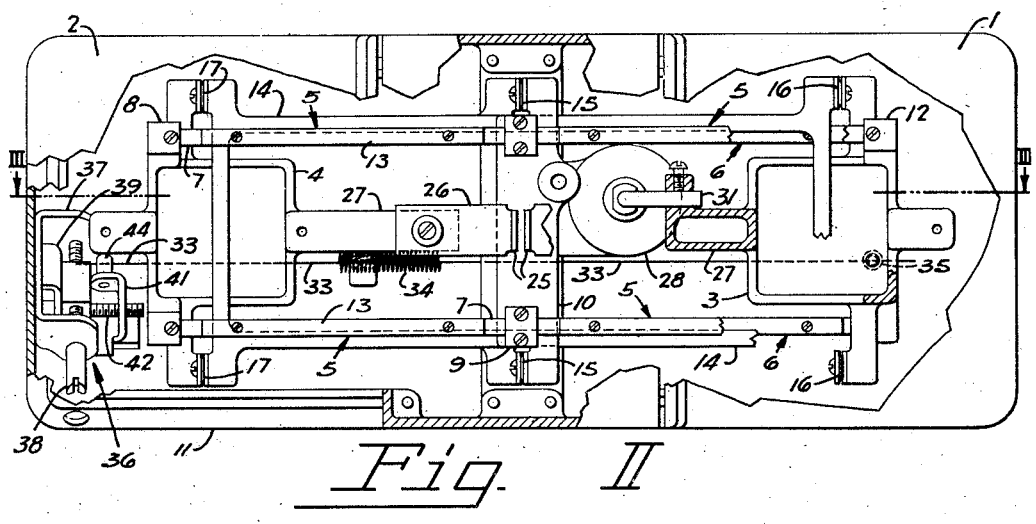

2,584,950

UNITED STATES PATENT OFFICE 2,584,950

SENSITIVITY ADJUSTMENT FOR WEIGHING SCALES

Mark A. Weckerly, Toledo, Ohio, assignor to Toledo Scale Company, Toledo, Ohio, a corporation of New Jersey Application March 3, 1947, Serial No. 731,956

2 Claims. (Cl. 265—54)

1

This invention relates to weighing scales and in particular to elastic means for adjusting the sensitivity of a weighing scale.

It has long been known that the sensitivity of a balance or of a weighing scale may be adjusted by varying the pendularity of a lever of the scale. In fact, all balances and practically all weighing scales have means for adjusting the pendularity of one or more movable members. A serious disadvantage of this method of sensitivity adjustment is that a portable scale adjusted in this manner changes its zero adjustment when it is tipped out of level.

The principal object of this invention is to provide sensitivity adjusting means employing elastic members rather than adjusting the pendularity of a lever so that the sensitivity adjustment is not affected by tipping the scale out of level.

Another object of the invention is to provide a thermostatically controlled sensitivity adjustment that corrects for errors in sensitivity resulting from changes in temperature.

These and other more specific objects and advantages are obtained according to the invention, examples of which are illustrated in the accompanying drawings.

According to the invention the sensitivity of a weighing scale is adjusted by applying a substantially constant force exerted by an elastic member to a portion of the weighing scale that moves along an arcuate path, the line of action of the force being in the plane of the arcuate path and substantially perpendicular to a chord thereof. The magnitude of the elastically applied force may be varied by manually adjustable means or according to temperature by thermostatically controlled means. A portable weighing scale incorporating the improved sensitivity adjustment is illustrated in the accompanying drawings.

In the drawings:

Figure I is a front elevation with parts broken away and other parts shown in section of a weighing scale embodying the invention.

Figure II is a plan view with parts broken away and parts shown in section of the weighing scale shown in Figure I.

Figure III is a fragmentary vertical section taken substantially along the line III—III of Figure II.

Figure IV is a fragmentary vertical section taken along the line IV—IV of Figure I.

Figure V is a detail sectional view taken substantially along the line V—V of Figure IV.

Figure VI is a fragmentary detail showing an-

2 other method of adjusting the tension in the elastic member.

Figure VII is a fragmentary vertical section showing another method of applying the sensitivity adjusting force.

Figure VIII is a transverse vertical section taken along the line VIII—VIII of Figure VII.

Figure IX is a fragmentary horizontal section taken along the line IX—IX of Figure VII.

These specific figures and the accompanying description are intended merely to illustrate the invention but not to impose limitations on the claims.

The sensitivity adjusting means may be employed advantageously in any portable weighing scale and it is particularly advantageous in small even arm balances employing flexure ribbons in lieu of pivots. Such a weighing scale is illustrated in Figure I. This scale includes a load receiver 1 and a counterweight receiver 2 that are mounted from spiders 3 and 4 respectively. The spiders 3 and 4 are constrained to move along arcuate paths by upper and lower check links 5 and 6. The check links 5, one set on each side of the scale, each consist of a thin metallic ribbon 7 that is attached to a lug 8 of the counterweight receiver spider 4, the upper surface of a lug 9 extending from a bridge 10 that spans the space between the sides of a scale housing 11, and a lug 12 extending laterally from the load receiver spider 3. The check link ribbon 7 forming the check links 5 is rigidly supported throughout the greater portion of its length by reinforcing plates 13. The plates 13 are short enough to leave short portions of the ribbon 7 adjacent each of its connections unsupported so that these short portions act as hinges to permit movement of the spiders. The lower check links 6 are similarly constructed. This combination of check links permits the load receivers to move along accurately predetermined paths.

Movement of the load receivers along their respective paths is controlled by a lever 14 that, by means of flexure ribbons 15, is suspended from the bridge 10. The load receiver spiders 3 and 4 are supported from the lever by load ribbons 16 and 17. The condition of balance between loads placed on the load receivers 1 and 2 (the counterweight receiver 2 being considered as an alternative load receiver) is indicated by an indicator 18 that extends upwardly within a center tower 19 and that cooperates with indicia 20 on a chart 21 to indicate the degree of unbalance between the loads. The indicator 18 is a long thin wand made either or light wood or aluminum tubing and is mounted in a rubber or resilient plastic sleeve 22 extending upwardly from a ferrule 23 that is clamped to a horizontal portion of a U-shaped indicator drive spring 24. The legs of the spring 24 are clamped to upright portions 25 of extensions 26 mounted on inwardly directed arms 27 of the load receiver spiders. Relative vertical movement of the load receiver spiders causes the U-shaped indicator drive spring 24 to flex laterally and thus drive the tip of the indicator 18 along the chart 21.

This combination of flexible members or springs serving as check links, as lever connections, and as indicator connections provides a weighing scale having an elastic or spring counter force for offsetting small differences between the loads applied to the load receivers. A portion of the counter force results from the stiffness of the check link ribbons and the load receiver supporting ribbons. The remainder of the elastic counter force is provided by the U-shaped indicator drive spring 24.

Continued oscillations of the load receivers and the indicator in response to a suddenly applied load are suppressed by a hydraulic dash pot 28 having a plunger 29 that is connected through a ball and socket joint 30 to an elbow 31 extending laterally from the load receiver spider 3.

A change in sensitivity of approximately 2:1 may be obtained in this scale by reversing clamps 32 that hold the U-shaped indicator spring 24 to the upright portions 25 of the extensions 26. Reversing the clamps 32 has the effect of shortening the free length of the legs of the U-shaped indicator spring 24 so that it becomes relatively more effective in offsetting increments of load.

A continuous change in sensitivity is effected by varying the tension in a wire 33 a portion of which is coiled into a spring 34. One end of the wire 33 is secured in a boss 35 depending downwardly from the load receiver spider 3. The other end of the wire 33 is attached to an adjusting device 36 that, in turn, is secured to the end of the housing 11 under the counterweight receiver 2. Increasing the tension in the wire 33 has the effect of increasing the sensitivity of the scale. This follows because the load receiver spider 3 moves along an arcuate path, the radius of which is less than the distance between the end connections of the wire 33. Because of the difference in length the horizontal force transmitted through the wire 33 results in an overturning moment tending to increase the travel of the load receivers away from a neutral position. This overturning moment assists the unbalancing load to overcome the resilience of the various springs and thereby increase the indicator travel per unit of unbalanced weight.

To take full advantage of the opportunities afforded by the resiliently applied force it is necessary to adjust both its magnitude and its direction. The magnitude of the force is important because it directly influences the sensitivity. The line of action or direction of the force is important because any error in this direction appears as an error in zero balance and also makes it difficult to secure equal travel of the indicator either side of its zero position for equal increments of unbalance. For this reason the adjusting mechanism of the adjusting device 36 provides adjustment in either of two directions.

Referring to Figures II to V inclusive and in particular to Figures III and IV, the adjusting device 36 consists of a U-shaped frame 37 that is secured to the end wall of the scale housing 11. A threaded stem 38 is journaled in the ends of the U-shaped frame which is oriented in the housing to secure as great a vertical displacement as possible and still permit a screw driver to be inserted through the side of the housing and applied to the end of the screw 38. A generally L-shaped carriage 39 including a nut 40 threaded on the stem 38 is adjustable along the length of the U-shaped bracket 37. One arm of the carriage 39 extends horizontally in the direction of the wire 33 and carries a clip 41 that is slidable therealong and that is retained by an adjusting screw 42 the head of which may be reached through a slot 43 in the end of the housing. A post 44 (Figure III) depending from the clip 41 serves as an attachment point for the end of the wire 33.

Adjustment of the screw 42, by varying the tension in the wire 33, changes the sensitivity of the weighing scale. The coil spring portion 34 is included so that the horizontal force applied to the spider 3 remains substantially constant throughout the travel of the spider and so that the sensitivity adjustment effected by turning the screw 42 is not too critical. The alignment between the wire 33 and the check links is varied by adjusting the carriage 39 by rotation of the threaded screw 38. The vertical component of this motion is effective and may be used for setting the scale to zero. The horizontal component of motion since it exerts only a sidewise force on the spider is not a factor in setting the sensitivity or the zero of the scale. Therefore the angle of inclination of the screw may be varied to suit the space available without affecting the performance of the scale.

A weighing scale employing ordinary resilient elements usually has an appreciable change in sensitivity with temperature. The weighing scale illustrated in Figures I to V inclusive is no exception. However, in normal operation the weighing capacity of the chart is such a small fraction of the total weighing capacity of the scale that its changes in sensitivity with temperature may be disregarded. Where the weighing capacity represented by the chart is a sufficiently large fraction of the total weighing capacity of the scale that the temperature effects must be considered the adjusting mechanism 36 may include a thermostatic element. If the sensitivity need not be manually adjusted a simple thermostatic strip such as a bimetal strip 45 (Figure VI) may be used. The bimetal strip 45 is secured to a block 46 attached to the end of the housing of the scale and its initial tension is adjusted by a set screw 47 that bears against a portion of the strip. The wire 48 connected between the free end of the bimetal strip 45 and a load receiver at the other end of the weighing scale serves to apply a horizontal force to that load receiver. The magnitude of the force is varied according to temperature by temperature stresses set up in the bimetal strip 45. The strip 45 may also serve in place of the spring 34 in maintaining the force substantially constant throughout the travel of the load receiver. The use of a bimetal strip permits simple automatic correction of the temperature error of this type of weighing scale.

It is not necessary that the force be applied to the load receiver spider. Similar adjustments of sensitivity may be attained by applying the force to other parts of the scale that move through arcuate paths, the force being directed in such a way that it assists movement of the member away from its neutral position. Referring to Figure VII, inwardly directed arms 49 and 50 of load receiver spiders carry extensions 51 and 52 having upright ends 53 and 54 to which the legs of a U-shaped indicator spring 55 are clamped. An indicator 56 (see also Figure VIII) is mounted in a rubber or plastic sleeve 57 that is molded into a ferrule 58. The ferrule 58 is clamped to the upper horizontal portion of the U-shaped indicator spring 55. A side arm 59 clamped under the ferrule 58 carries a finger 60 that extends upwardly alongside the indicator 56 and that at its upper end carries the upper end of a thin flexible ribbon 61. The ribbon hangs downwardly and at its lower end is clamped to an L-shaped bracket 62 that is mounted on the end of a horizontal leaf spring 63. The other end of the leaf spring 63 is clamped to the upper surface of a block 64 that is rockably mounted on the end of a horizontally disposed bar 65. A cylindrical pin 66 interposed between the block 64 and the bar 65 and a pair of screws 67 permit the angular relationship between the block and the bar to be adjusted so that, by changing the angular relationship, the force with which the spring 63 pulls on the thin ribbon 61 may be adjusted. The bar 65 is adjustable longitudinally to permit the scale to be balanced at zero and to have equal deflections on either side of zero for equal increments of unbalanced load. The longitudinal adjustment is obtained by loosening a pair of screws 68 that extending upwardly through slots 69 in a horizontal portion 70 of a bridge 71 are threaded into the bar 65. A third screw 72 threaded upwardly through the horizontal portion 70 has an eccentric tip 73 that engages a transverse slot 74 in the bar 65. Rotation of the screw 72 provides longitudinal adjustment and the bar is clamped in adjusted position by tightening the screws 68.

Since the indicator travels a considerable distance a very small force is required in the ribbon 61 to provide a large change in sensitivity. In a weighing scale of the type illustrated in Figure I having a total weighing capacity of five pounds the ribbon 61 was made of steel approximately $\frac{1}{16}$ of an inch wide and .002 of an inch thick. The spring 63 is approximately 3 inches long, ¼ of an inch wide and .025 of an inch thick. Adjustments of the tension in the leaf spring 63 permits the sensitivity of this weighing scale to be varied through a range of 3 or 4 to 1 without producing instability.

In each example the sensitivity of the weighing scale is adjusted by applying a force to a member of the scale that moves along an arcuate path. The line of action of the force is substantially in the plane of the arcuate path and perpendicular to a chord of that path. In each example the magnitude of the force is adjustable to vary the sensitivity and the line of action is adjustable to secure a constant zero and correct sensitivity throughout the weighing range.

The specific sensitivity adjusting mechanism shown in the examples may be modified as required to adapt it to various weighing scales without departing from the spirit and scope of the invention.

Having described the invention, I claim:

1. In a weighing scale, in combination, a weighing mechanism comprising a first and a second member one of which moves relative to the other with changes in load, a U-shaped spring having legs attached one to each of the members, an indicator mounted on the U-shaped spring, a finger attached to the spring and extending parallel to the indicator, a flexible tension member connected to the finger and extending along a line adjacent and generally parallel to the legs of the U-shaped spring, and adjustable resilient means for anchoring the end of the tension member and keeping the member under tension.

2. In a weighing scale, in combination, a weighing mechanism comprising a first and a second member one of which moves relative to the other with changes in load, a U-shaped spring having legs attached one to each of the members, an indicator mounted on the U-shaped spring, a finger attached to the spring and extending parallel to the indicator, a flexible tension member that is longer than the combined length of the finger and the legs of the U-shaped spring and that is connected to the finger and that extends along a line adjacent to and generally parallel to the legs of the U-shaped spring, and adjustable resilient means for anchoring the end of the tension member and keeping the member under tension.

MARK A. WECKERLY.

REFERENCES CITED

The following references are of record in the file of this patent:

UNITED STATES PATENTS

| Number | Name | Date |
|---|---|---|
| 196,865 | Bellamy | Nov. 6, 1877 |
| 2,097,025 | Flanagan | Oct. 26, 1937 |
| 2,144,845 | Kniesche | Jan. 24, 1939 |
| 2,229,156 | Wertheimer | Jan. 21, 1941 |
| 2,279,261 | Crawford et al. | Apr. 7, 1942 |
| 2,327,697 | Boucher | Aug. 24, 1943 |